Feb. 12, 1963 J. V. CONLIN 3,077,301
MULTIPLE CONVEYOR COUNTER
Filed March 22, 1957 2 Sheets-Sheet 1

INVENTOR
JAMES V. CONLIN

BY *Alton V. Oberholtzer*

ATTORNEY

Feb. 12, 1963  J. V. CONLIN  3,077,301
MULTIPLE CONVEYOR COUNTER
Filed March 22, 1957  2 Sheets-Sheet 2
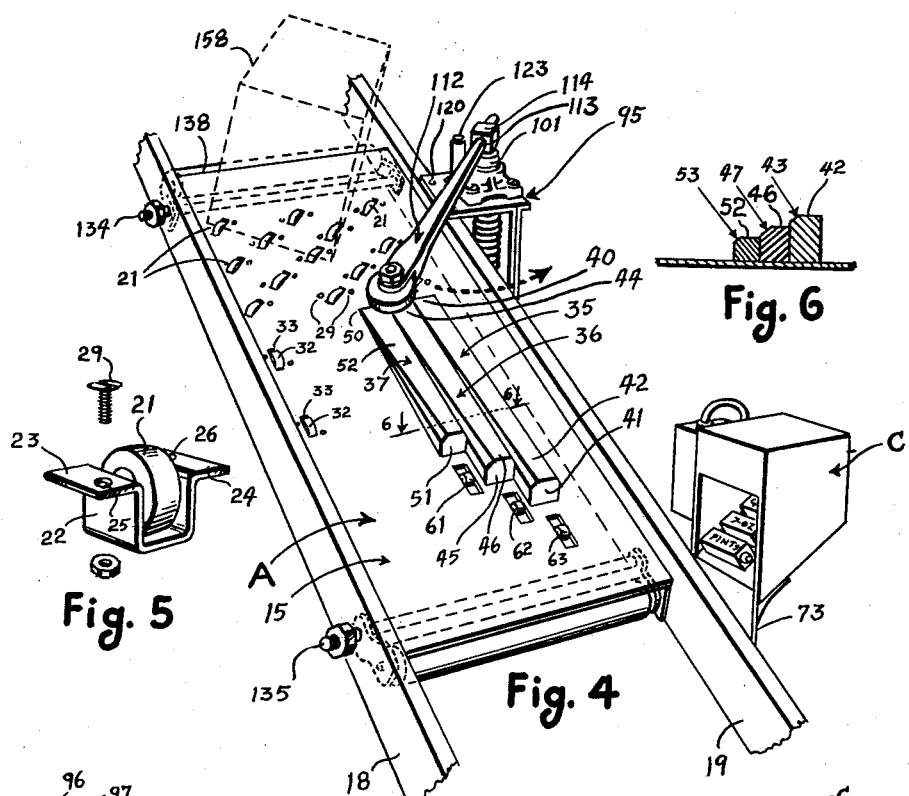
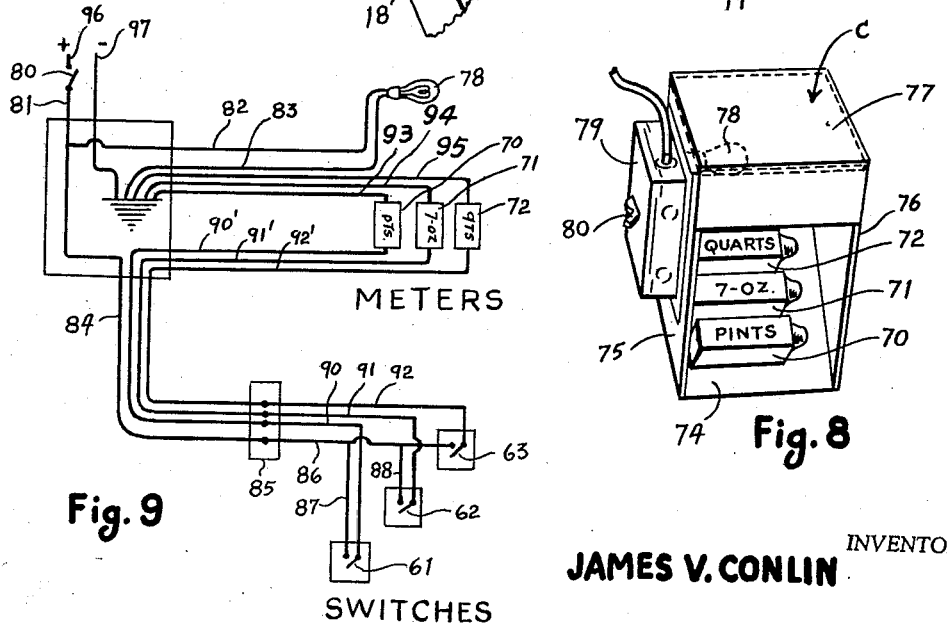
INVENTOR
JAMES V. CONLIN
BY *Alton V. Oberholtzer*
ATTORNEY

United States Patent Office 3,077,301
Patented Feb. 12, 1963

3,077,301
MULTIPLE CONVEYOR COUNTER
James V. Conlin, 2336 Mayfair Ave.,
White Bear Lake 10, Minn.
Filed Mar. 22, 1957, Ser. No. 647,857
14 Claims. (Cl. 235—98)

This invention relates to an improved conveyor counter for counting different size objects when passing therealong in end to end relationship and the method therefor. More particularly the improvement relates to a counter for cartons of different sizes provided as an insert in alignment with a conveyor path of travel for passing different size rectangularly shaped cartons thereover. The insert preferably being installed by by-passing the conveyor belt thereunder or providing a conveyor chute with a friction surface over which the cartons are slid onto the insert and moved into selective alignment according to size to engage independently against single micro switches in the conveyor path through which all the cartons pass.

The art has heretofore provided swinging switch arm mechanism and sorters for different size objects. This includes counters for barrels, boxes and cans. These counters generally are provided as one or more skid paths or passageways, having rollers and the like, of which a plurality serving as contacts must be actuated simultaneously in order to close a circuit. These arrangements usually require cooperative primary and secondary switch mechanisms for different size objects. Otherwise single switch mechansm has been provided to count the number of similar size objects passing along a conveyor. Thus it will be recognized that a practical and effective method and counter mechanism which can substantially simultaneously align, guide and count an irregular assortment of different size cartons passing along a single conveyor are needed in the art.

Accordingly, it is an object of this invention to provide an improved method and structure for counting different size cartons passing in irregular order through a single conveyor passageway.

Another object of this invention or improvement is to provide a carton aligning and counter arrangement for different carton sizes in a conveyor which does not materially effect any of the alignment of the normal path of travel of the cartons in a previously established normal path of the conveyor.

Another object of this invention and improvement is to provide a conveyor counter for objects of different size which is adapted to be mounted in substantially flush alignment with the path of travel of a conveyor belt to align different sized objects over a switch mechanism for actuating a numbering system according to the size of the object.

A further object of this improvement is to provide a method of counting a series of different size cartons as they are passed in mixed and assorted lots from a receiving platform down an incline-chute conveyor.

Further objects and advantage will be apparent from the following description of the accompanying drawings, wherein:

FIGURE 4 is a partial perspective showing a manner of mounting the insert counter between the standard size guides of a conveyor belt shown in partial detail;

FIGURE 5 is a perspective illustrating a carton guide roller and its mounting bracket;

FIGURE 6 is a vertical end view through line 6—6 of the structure of FIGURE 4 illustrating the stepped relationship of slide guide bars for sorting different sizes of cartons into straight path alignment according to carton size;

FIGURE 8 is a perspective of the arrangement of a plurality of counters, and

FIGURE 9 is a diagrammatic plan view illustrating the electrical circuits in my conveyor counter for box cartons.

Figure 2:
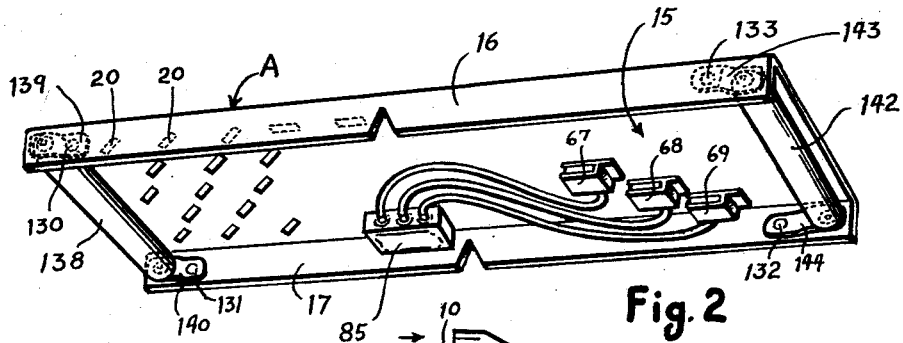
FIGURE 2 is a perspective showing the underneath side of the insert counter.

Referring to the drawings like parts will be similarly indicated and essentially the FIGURES 2 through 9 illustrate the elements of my counter structure. The FIGURE 1 is illustrative of a particular application and arrangement devised for counting different sizes of return cartons which hold, for example, empty bottles of pint, seven ounce and quart sizes.

Figure 1:
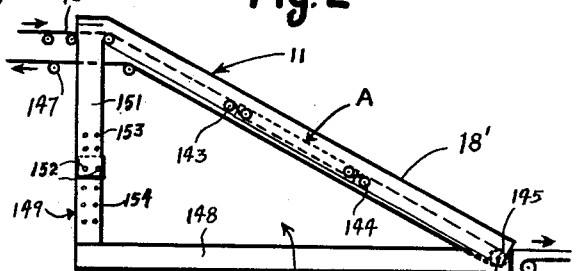
FIGURE 1 is a diagrammatic side plan view of my conveyor counter with one side of the conveyor structure removed and illustrating a manner of mounting the counter as an insert in an inclined position with its top surface normally flush with the path of travel of a conveyor belt arrangement.

Referring to FIGURE 1, the description is made as pertaining to an unloading belt conveyor 10 upon which are placed an assortment of different carton sizes irrespective of any particular order or angle of placement. Usually, as when unloading beer bottles the conveyor 10 carries an assortment of cartons of empty bottles onto an incline pathway 11 down which the cartons slide to be picked up by hand or conveyed away by a further transporting conveyor belt 12 of conventional arrangement.

Figure 3:
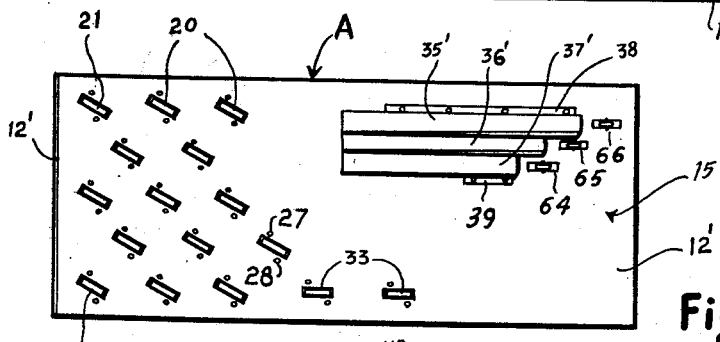
FIGURE 3 is a slightly modified top plan view of the structure shown in FIGURES 1 and 2.

With particular reference first to FIGURES 2, 3 and 4, there is shown a slide platform A having a base plate 12' provided with a pair of opposite downturned side plates 16 and 17. The side plates 16 and 17 serve as supports for mounting the plate 15 between a pair of side rails as conveyor guides 18 and 19. Downturned or smooth leading edge 12' prevents snags.

The rear portion of plate 15 is provided with a series of apertures 20 positioned in spaced rows extending at an angle of about 60° relative to the length of carton slide surface on plate 15. A series of rollers 21 are conventionally mounted to freely roll in U-shaped brackets 22. The brackets 22 have flanged ends 23 and 24 which are provided with apertures 25 and 26 for alignment with correspondingly located apertures 27 and 28 in plate 15. A number of suitable bolts and nut sets 29 secure the brackets 22 beneath plate 15. The secured brackets 22 hold an outer periphery of the rollers 21 in a free turning relationship slightly above the surface of the plate 15 and at an angle to the longitudinal length thereof.

Exactly similar and additional rollers 32 are likewise mounted to extend through apertures 33 cut in relative parallel alignment with the longitudinal length of plate 15. The rollers 21 and 32 cooperate to align different size cartons over suitable raised guide or bar slides, as hereinafter described.

Secured to the upper surface of plate 15, as by spot welding or otherwise as an integral pressed out portion thereof, along one side opposite rollers 32 are a plurality of carton sorting slide bars and guides 35, 36 and 37 arranged in parallel and stepped relationship as to length and vertical height. In the modified view of FIGURE 3 the slides 35', 36' and 37' may be an integral unit having side flange 38 and 39 which are spot welded or bolted to the top of plate 15.

Starting with outside bar 35, which is of greater length than the intermediate bar 36 and the shorter bar 37, the back end 40 starts from a point relatively flush with the top of plate 15 and the forward end 41 is raised from the level of plate 15 to afford a relatively gradually inclined surface 42 extending gradually upwardly from end 40 to end 41 with respect to the surface of plate 15. This relative inclined surface 42 provides a raised riding surface for large size cartons which slide thereover. The inner top edge 43 is cut down or beveled at an angle of about 25°, as shown in FIGURE 6, to provide a slide surface which guides and aids in aligning smaller cartons to ride over onto the adjacent bar 36 when cartons are of lesser width than the distance between the chute conveyor side 18 and the edge 43 of bar 35.

The next or intermediate guide and slide bar 36 is of shorter length than the outside bar 35 and of greater length than the adjacent inner slide bar 37. The back end 44 of bar 36 starts on a level with end 40 of bar 35 and the front end 45 is raised from the level of plate 15 to a somewhat lesser height than the extended end 41 of bar 35. The difference in height between end 44 and end 45 provides a carton riding surface 46 positioned at an inclined angle to the top of plate 15. The inner upper edge 47 of bar 36 is cut or beveled at an angle of about 45°, as shown in FIGURE 6, to provide an angular guide for shifting cartons, of a lesser width than the distance between the chute or conveyor side 18 and bar 36, onto bar 37.

The inner guide and slide bar 37 is in stepped down relationship both in height and length relative to the adjacent guide and slide bar 36. The back end 50 of bar 37 starts to incline upwardly at a point adjacent the lower levels of bars 35 and 36 and the foremost end 51 is raised from the level of plate 15 to a somewhat lesser height than the extended ends 45 and 41 of bars 36 and 35, respectively. The difference in height between end 50 and end 51 provides a carton riding surface 52 on an inclined angle relative to the top of plate 15. The upper inner edge 53 of bar 37 may be cut or beveled at an angle of about 45° to provide a downwardly sloping guide for shifting cartons, of a lesser width than the distance between the chute or conveyor side 18 and bar 37, onto the skid surface of plate 15.

From the above description, taken in conjunction with the drawings, it will be recognized that the relative different lengths of guide bars 35, 36 and 37, as represented by the stepped down relationship of ends 41, 45 and 51, respectively, and the correspondingly stepped up and increasingly greater heights of the slide bar tops 52, 46 and 42, in the order enumerated, provide for aligning and positioning each carton of series flow of different sized cartons, automatically into engagement with one of a series of associated automatic carton counters, as hereinafter described.

The automatic carton counters are a series of conventional microswitch make and break contacts or actuators 61, 62 and 63 extending through the apertures 64, 65 and 66, respectively, in plate 15. The micro-switches 61, 62 and 63 are mounted in conventional housings 67, 68 and 69 which are spot welded or otherwise suitably secured or mounted to the underneath side of plate 15. The actuators 61, 62, and 63 may be pins or rollers positioned in a relatively stepped up relationship and aligned with the ends 51, 45 and 41 respectively in order to count the cartons independently according to their differences in size, when aligned with one side in riding relationship against, for example, the side rail 18 of the conveyor. Thus, as each carton differing in size selectively passes from the respective end of a corresponding slide, the carton engages against a corresponding micro-switch contact which actuates the micro-switch to count the different size cartons.

Electrically connected to the micro-switches, through a circuit system, as exemplified in FIGURE 9, are a corresponding group of conventional counters 70, 71 and 72. The counters 70, 71 and 72 are representative of pint, seven ounce and quart sizes which are cased in different size cartons. The majority of return store cartons in most cases are pint sizes and for ease of reading are mounted in the order shown within the frame C. The frame C may be conveniently mounted to the conveyor side 19 by a pair of brackets 73 (one only being shown) suitably attached between the base 74 of casing C and the conveyor side 19. For purposes of illustration the casing C is shown as a partial enclosure with the base 74 positioned on an incline with side walls 75 and 76 and top 77 (rear wall not shown). Mounted within the casing C is a light socket and bulb 78 for illuminating the counters 70, 71 and 72. A switch casing 79 is suitably mounted on the side wall 75 for control of the electric circuits to the micro-switches 61, 62, and 63 which actuate counters 70, 71 and 72, respectively, and light 78.

For example, as illustrated in FIGURE 9, the switch 80 is in control of lead 81 which is connected to socket and light 78 through conductor 82, grounded through conductor 83, and through conductor 84 to a connection box 85. The connection box 85 is provided with a conductor 86 connected to a contact point in micro-switch casing 69 and through conductors 87 and 88 to contact points in micro-switch casings 67 and 68, respectively. The micro-switch make and break actuators 61, 62, and 63 are provided with conductors 90, 91 and 92 connected through connector box 85 and conductors 90', 91' and 92' with counters 70, 71 and 72, respectively. Suitable grounds 93, 94 and 95 are provided for conductors 90', 91' and 92', respectively. Suitable lead-ins 96 and 97 are connected to a conventional source of electric power.

Figure 7:
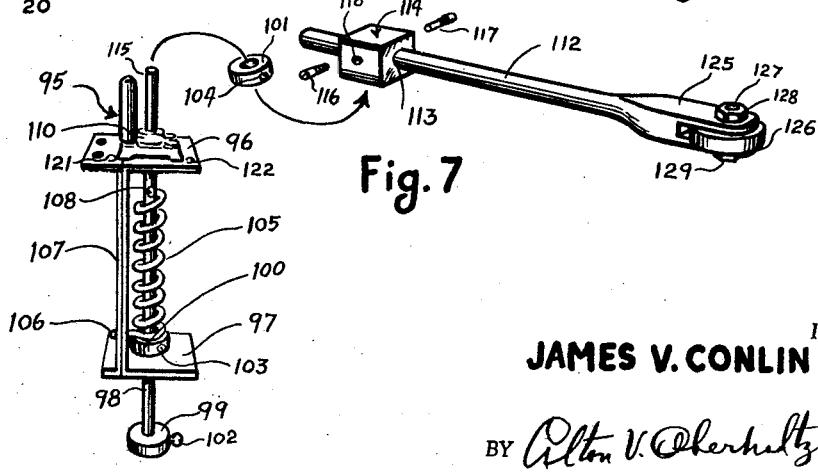
FIGURE 7 is an exploded perspective showing details of the force guide arm seen in FIGURE 4 mounted to swing over the slide guide bars illustrated in their stepped relationship in FIGURE 6.

In order to straighten out the cartons as they pass over the conveyor counter A and force them to ride over the proper slides for consecutive actuation of the proper switches 61, 62 and 63, there is provided a box slide control arm arrangement 95 mounted on the conveyor side 19. There is shown in FIGURE 7 the relative detail of a resilient mounting for a slide arm arrangement 95. This arrangement comprises a pair of spaced plates 96 and 97 having apertures (not shown as such) through which extends a pivotal rod 98. The rod 98 is longer than the distance between plates 96 and 97 so that it may be relatively adjustably mounted within the apertures therein by a pair of locking slide washers 99, 100 and 101. The slide washers 99, 100 and 101 are provided with threaded apertures in which are seated screws 102, 103 and 104, respectively which turn down against rod 98 on opposite sides of the plates 97 and over the top plate 96, respectively.

A relatively strong spring 105 is wrapped around rod 98. The spring 105 has its one end 106 anchored as by a metal strip or bolt 107, suitably secured between plates 96 and 97, and the other end 108 anchored in a suitable aperture in rod 98. This spring 105, in its attached relationship, provides strong pressure on the rod 98 when it is turned against the compression of the spring 105. A bearing plate 110 is bolted or suitably secured to plate 96, about rod 98 to absorb the initial turning pressure placed on arm 112. The arm 112 slides through aperture 113 in block 114 which is spot welded or otherwise solidly attached to the end 115 of rod 98, as shown in FIGURE 4. A pair of set screws 116 and 117 are adapted to be threaded into a pair of apertures 118 (one only being shown) to seat against arm 112 to hold the arm 112 in a desired predetermined position along a substantial portion of the length thereof. Thus when the control arm arrangement 95 is fastened to conveyor side 19, as by screws or bolts 120 (one only being shown) through apertures 121 and 122 and corresponding apertures (not shown) in side 19, the arm 112 is normally held under tension against stop 123 and extends over the inclined surfaces 42, 46 and 52. As described, the rod 98 can be raised or lowered to position arm 112 at various and different distances over the plate 15 by a proper setting of the rod 98 and securing of the washers 99, 100 and 101 relative thereto. Also, the arm 112 can be made shorter or longer relative to extending over the plate 15 by proper positioning in block 114 and setting of screws 116 and 117, as described. The stop 123 is threaded into a suitable aperture in plate 96 or otherwise spot welded thereto. The end 125 of arm 12 is preferably bifurcated and secures a slide or roller 126 on pinion 127 mounted through suitable apertures therethrough and secured by nuts 128 and 129 which can be turned down to allow roller 126 to turn freely or tightened to cause roller 126 to serve as a retaining slide which tends to slow down the slippage of a carton therepast.

While it will be understood that the placement of the multiple carton counter arrangement may be on any level with the normal plane of the conveyor or chute for transporting different size cartons, the immediate illustrative purpose is for counting, for example, return beer bottle cartons as they are unloaded. The usual practice is to unload a truck at the unloading platform by placing the cartons on a conveyor 10 for carry into a building usually at a lower level than the unloading platform. A bottle checker and a carton counter usually stand adjacent the lower level of the incoming conveyor. Ordinarily the down pitch of the incoming conveyor is about 35 degrees, the carton sizes vary in sizes of pints, seven ounce and quart cases and they generally ride as they are placed on the conveyor in haphazard and misaligned relationship.

Thus, the illustrated structure of FIGURE 1 is designed to illustrate an incline conveyor chute 13 down which different sizes of beer cartons are fed from a platform conveyor 10. The incline chute B is generally a portion of the conveyor system into which the counter assembly A is inserted with very little change in the path of travel of conveyor 10. For example, the preferred change is to use a conventional chute arrangement into which the counter unit A is inserted as by bolting between the conveyor sides 18 and 19, by-passing conveyor 10 underneath the counter unit A.

As shown in FIGURES 2 and 4, the sides 16 and 17 are provided with bolt apertures 130 and 131 at one end and apertures 132 and 133 at the other end. Suitable aligning apertures are bored through each of the sides 18 and 19 and suitable bolts 134 and 135 provide adequate anchoring or attaching means for fastening the counter unit A in position between the conveyor sides, as represented by 18 and 19. In order to by-pass conveyor 10 underneath the counter unit 18, there is provided a roller 138 mounted between brackets 139 and 140. The brackets 139 and 140 are spot welded, or otherwise secured, to the inner wall portions of sides 16 and 17 and hold the roller 138 just beneath the top slide 15. On the opposite end of the counter unit A another roller 142 is similarly mounted by a like pair of brackets 143 and 144. The rollers 138 and 142 thereby provide guides under which the conveyor belt 10 can pass from over roller 143 onto roller 144 down to roller 145 and back to the unloader platform over a series of drive and guide rollers of conventional character.

In some instances it may be desirable to provide the incline as an assembly with or without a moving conveyor 10. In this case the conveyor 10 may return from roller 147 after passing the cartons onto the conveyor slide and counter assembly B. This assembly B may be a frame having a base 148 with a pair of uprights 149 (one only being shown). The conveyor sides, as represented by 18' and a companion opposite side (not shown), may be adjustable to different incline positions by their attachment at the forward lower end to base 148 with a pivot pin 150 and at the rear raised end having a pair of depending legs 151 (one only being shown) secured by bolts 152 to the uprights 149. The legs 151 and uprights 149 are provided with a number of apertures 153 and 154, respectively, which with proper relative alignment for bolts 152 position the angle at which cartons slide over the incline of chute or conveyor B.

As heretofore described, the cartons ordinarily pass from the horizontal travel of conveyor 10 onto the top of plate 15, or incline surface of travel, riding at an angle thereto as illustrated by the dotted lines 158. As the one carton side adjacent conveyor side 19 is pushed or slides into contact with the slide or roller 126 on arm 112, the tension of spring 105 causes the forward end of the carton to be forced over so that an opposite side of the carton engages against the wall formed by conveyor side 18. The rearward portion of the carton is then riding on rollers 21 which shift the entire opposite one side of the carton to ride against conveyor side 18. As the carton is straightened by the rollers 21 and tension or force on arm 112 it continues to move forwardly passing over one or more of the slide guides 37, 36 and 35 depending on the width of the carton. The sloping or beveled edge 43 aids in guiding a carton bottom onto slide surface 46 and sloping or beveled edge 47 aids in guiding a small carton size to ride on the slide surface 52. Thereby, dependent upon the width of the carton, the wider cartons, for example the quart size cartons, ride over the raised slide surface 42 and drop from end 41 to contact the micro-switch actuator 63; the next size or seven ounce cartons ride over the raised slide surface 46 and drop from end 45 to contact micro-switch actuator 62, and the pint size cartons ride over the raised slide surface 52 to make contact with micro-switch actuator 61.

When the angle of slide is excessive and the flow of cartons relatively fast, they would normally tend to jump or override the micro-switch actuators. However, by reason of the pressure of roller or slide 126 against the carton side or a restraining friction of the incline conveyor surface, represented by conveyor 10, the speed of carton slippage is reduced so that the rearmost ends of the cartons drop and make contact with the proper micro-switch actuator, as described. Otherwise the micro-switches 63, 62 and 61 are set at suitable distances relative to the drop from ends 41, 45 and 51 to be actuated only once by each object to be counted as it moves from its slide surface 42, 46 and 52, respectively, according to the width of the object, as described. In addition, in the event of stoppage, the relative ends 41, 45 and 51 prevent any back slippage for a recount of a carton once the carton has actuated its corresponding counting switch. Normally the front end of a carton tips down first into contact with the belt or is under friction as it passes from the top surface of plate 15 back onto the conveyor 10 or like chute portion. It will be apparent that the guide arm 112, or a similar carton bearing surface, will be set or positioned in a suitable manner, as desired, for properly aligning one carton side against a one wall side of the conveyor and over a proper slide surface as 42, 46 and 52. Ordinarily the conveyor 10 is a friction surface and misaligned cartons cannot easily be pushed to one side thereon. Otherwise were the conveyor 10 a slide surface, the preferred arrangement of the rollers might be eliminated and the cartons aligned against one side of the conveyor as they pass thereover according to their width over the proper single micro-switch for counting. The principle of the counter mechanism may be reversed. That is, it will be recognized that the guide bars 35, 36 and 37, when properly mounted, are operable on either the left or right side of the conveyor in conjunction with suitable arrangement of the other operative mechanism.

In accordance with the patent statutes, I have described the principle of construction and operation of my improved multiple counter for a conveyor system, and while I have endeavored to set forth the best embodiment thereof, I desire to have it understood that changes may be made within the scope of the following claims without departing from the spirit of my invention or improvement.

I claim:

1. An automatic counter for a conveyor carrying different size cartons comprising a flat slide surface, a plurality of separate gradually raised slide surfaces of different lengths in stepped-up relationship extending from said flat slide surface, independent counting means for counting cartons according to size associated with each of said separate raised slide surfaces, and arm means for engaging against different carton sides and aligning cartons in sliding relationship over one said separate raised slide surface for engagement with said independent counting means.

2. A conveyor counter for different sized cartons in a series flow thereover comprising a conveyor, side members for said conveyor, a flat slide surface mounted between said members, a series of adjacent carton aligning slide surfaces mounted over said slide surface in stepped up side by side relationship, a series of counting means associated with said series of carton aligning slide surfaces for separately counting each carton passing thereover, and resilient arm means for engaging against a carton side and aligning said carton with a corresponding carton aligning slide surface and associated counting means therefor.

3. A counter for different size cartons passing over a conveyor comprising a first carton slide surface, a plurality of auxiliary carton slide surfaces angularly positioned and in close relationship to said first slide surface, guide means associated with said auxiliary slide surfaces for aligning cartons thereon, a plurality of micro-switches in correlated relationship with said auxiliary carton slide surfaces, and a plurality of separate counter means associated with said micro-switches for independently counting each carton passing over said plurality of carton slide surfaces.

4. The structure of claim 3 wherein said plurality of auxiliary slide surfaces extend in side and end overlapping relationship.

5. The structure of claim 3 wherein the plurality of slides each have one relative end portion in offset relationship to said first slide surface and each of the plurality of micro-switches are in adjacent relationship to said one end portion.

6. The structure of claim 3 wherein said first slide surface is provided with a plurality of roller means cooperative with said plurality of slide surfaces, and said guide means for straightening cartons into proper alignment with said micro-switches.

7. In combination a carton conveyor for different size cartons and counter therefor comprising a belt conveyor, an insert slide surface aligned with the path of travel of said belt conveyor, carton aligning rollers on said slide surface, a plurality of raised slide surfaces of different length in side by side relationship on said insert slide surface, independent microswitch mechanism associated with each of said plurality of raised slide surfaces, and carton side engaging means for aligning different carton sizes over at least one of said plurality of raised slide surfaces.

8. In combination a conveyor and carton counter for different size cartons passing in irregular assortment thereover comprising a belt conveyor, carton aligning means associated with said conveyor, a slide surface inserted into alignment with the path of travel of said conveyor, a plurality of additional slide surfaces in adjacent relationship having raised carton riding surfaces offset at different distances from said first mentioned slide surface, a plurality of micro-switches associated with said additional slide surfaces, and counter means associated with said micro-switches for independently counting cartons aligned to ride upon one of said plurality of additional slide surface and engage one of said plurality of micro-switches.

9. The structure of claim 8 wherein said plurality of additional slide surfaces are in step relationship with the lower step intermost of said conveyor and the higher step adjacent an outside edge of said conveyor and the relative ends thereof extend in step relationship from the lower intermost slide surface to the higher outermost slide surface.

10. The structure of claim 9 wherein said plurality of microswitches are in step relationship relative to the said plurality of additional slide surfaces.

11. A conveyor counter structure for counting different size cartons passing in irregular assortment comprising in combination a conveyor, a conveyor side, a plurality of selective slide surfaces substantially in the path of travel of said conveyor, a guide means for aligning one side of each carton passing over said conveyor into riding relationship against said conveyor side, and carton counter mechanism controlled by the difference in size of cartons as determined by their selective engagement with said slide surfaces relative to their riding relationship against said conveyor side and said guide means.

12. An insert and counter arrangement for a conveyor structure to be used in counting an assorted alignment of different carton sizes being transported by said conveyor comprising a slide surface in alignment with the normal path of travel of said conveyor, a plurality of offset slide surfaces in side by side relationship and angularly inclined relative to said slide surface in alignment with the normal path of travel of said conveyor, a plurality of electrical contact means, one of each of which is associated with one of said offset slide surfaces, electrical counter means for enumerating the number of cartons passing from each one of said plurality of slide surfaces, and attaching means for connecting said insert into alignment with a conveyor path of travel.

13. In combination a conveyor and a counter for counting different size cartons passing along said conveyor, said counter comprising a plurality of carton slide surfaces in adjacent relationship, guide means for controlling different size cartons and their sliding relationship to said slide surfaces, separate electrical circuit and switch means associated with each slide surface for actuation by the difference in carton size relative to each slide surface, and separate counter mechanism controlled by said separate circuit and switch means.

14. In combination with a conveyor structure for different size cartons an inclined conveyor chute down which different size cartons are adapted to pass in irregular order, a plurality of carton slide surfaces in adjacent relationship on said inclined conveyor chute, carton aligning guide means for shifting cartons in end to end relationship and aligning the cartons according to width in riding relationship on said slide, separate electrical switch and circuit means associated with each one of said plurality of carton slide surfaces, and separate counter means connected to said separate electrical switch and circuit means for recording each different carton size relative to its relationship with one of said separate electrical switch and circuit means.

References Cited in the file of this patent

UNITED STATES PATENTS

| | | |
|---|---|---|
| 1,227,485 | Myers | May 22, 1917 |
| 1,563,446 | Sholtz | Dec. 1, 1925 |
| 1,700,365 | Broadmeyer | Jan. 29, 1929 |
| 1,855,767 | Neuman | Apr. 16, 1932 |
| 2,033,645 | Parkhill | Mar. 10, 1936 |
| 2,231,435 | Christian | Feb. 11, 1941 |
| 2,630,043 | Kolisch | Mar. 13, 1953 |
| 2,828,917 | Wheeler et al. | Apr. 1, 1958 |
| 2,843,321 | Sloan | July 15, 1958 |